July 29, 1924.
M. P. BREON
TIRE REMOVING MACHINE
Filed June 27, 1922
1,503,225
2 Sheets-Sheet 1
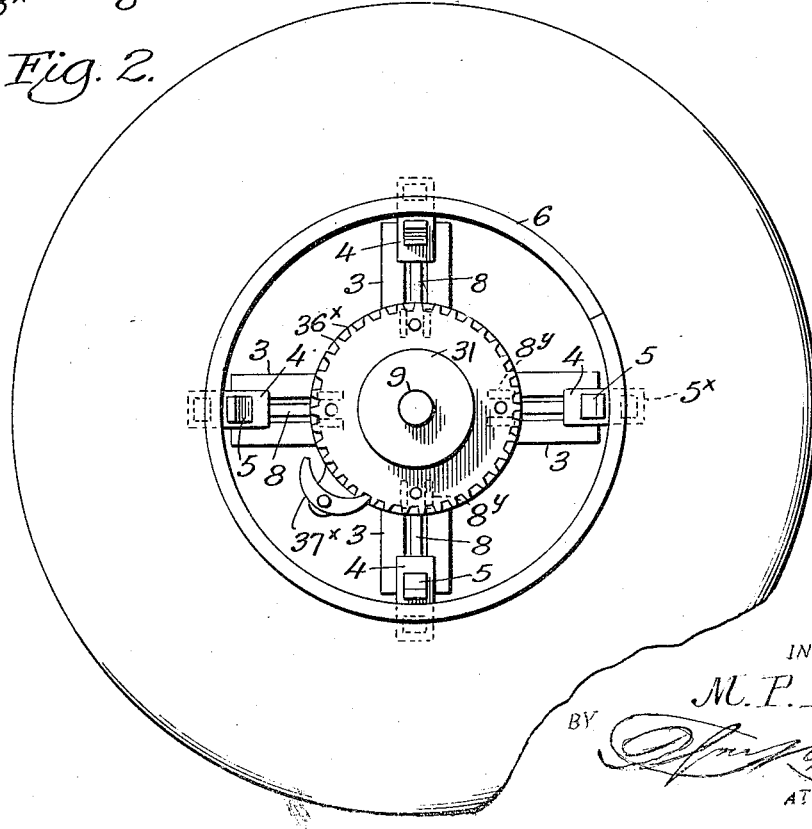

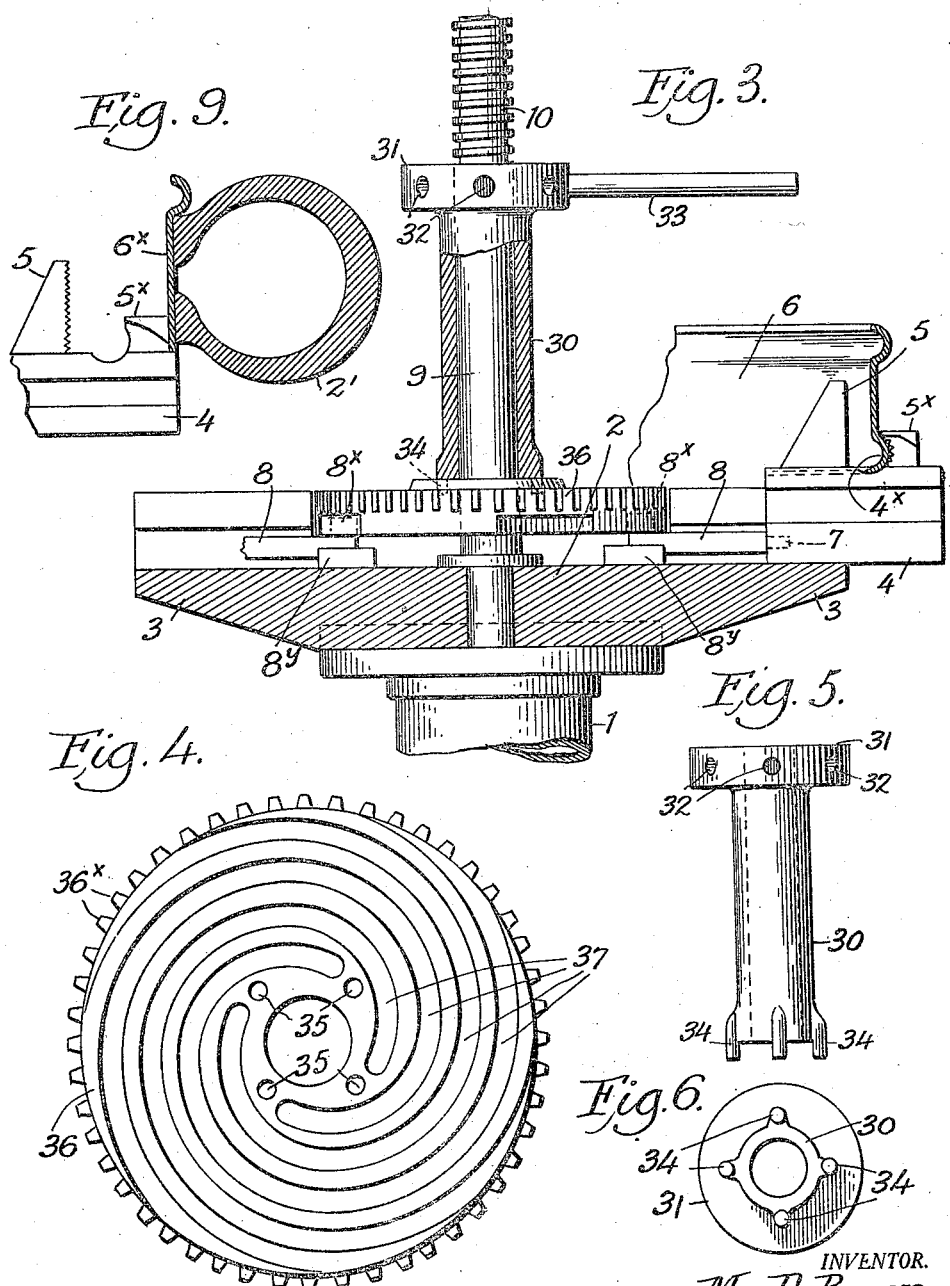

Patented July 29, 1924.

1,503,225

UNITED STATES PATENT OFFICE.

MAURICE PETER BREON, OF NEWPORT NEWS, VIRGINIA, ASSIGNOR TO CORA LOUISE BREON, OF NEWPORT NEWS, VIRGINIA.

TIRE-REMOVING MACHINE.

Application filed June 27, 1922. Serial No. 571,330.

*To all whom it may concern:*

Be it known that I, MAURICE PETER BREON, a resident of Newport News, in the county of Warwick and State of Virginia, a citizen of the United States, have invented certain new and useful Improvements in Tire-Removing Machines, of which the following is a specification.

My invention relates to improvements in tire removing machines, and one object of the present invention is the provision of means through the medium of which a split rim may be expeditiously and easily expanded to fix the same within a tire, and through the medium of which a split rim may be contracted to permit of the ready removal of a tire from the rim or the ready placing of a tire on the rim.

Another object is the provision in an apparatus of the character stated, whereby a solid or non-split rim may be strongly held against movement while a tire is being displaced therefrom.

Another object of my invention is the production of a tire-removing machine capable of use in connection with either a split or a solid rim, and which can be instantly applied and adjusted to its work.

Another object of my invention is the provision of a machine of the character and for the purposes stated which will be small and compact in size, strong and durable and capable of production at a price to merit the demand for such a machine.

To the attainment of the foregoing, the invention consists in the improvement as hereinafter described and definitely claimed, and as shown in the accompanying drawings, forming part of this specification, and in which:

Figure 1 is a side elevation showing an apparatus embodying the improved construction, and with a split wheel-rim and a tire properly positioned on the apparatus, said rim being broken away and said tire being in section.

Fig. 2 is a plan view of the same.

Fig. 3 is a detail showing the manner in which a split rim is arranged in the machine.

Fig. 4 is a detail inverted plan view of the cam comprised in the improvement.

Fig. 5 is a detail elevation of the rotatable sleeve of the improvement.

Fig. 6 is an inverted plan view of the same.

Figs. 7 and 8 are detail views of the cam links.

Fig. 9 is a detail view showing the manner in which a solid or non-split rim is held fast by the apparatus.

Similar numerals of reference designate corresponding parts in all of the views of the drawings.

The machine shown herein comprises a pedestal 1 on which is a table 2. The machine also comprises a central shaft 9, the upper portion of which is preferably, but not necessarily, threaded as indicated by 10.

In Fig. 1, I show a split rim 6, and I also show a tire on the rim and designated by 21.

The lower end of the upright shaft 9 is preferably fixed to the table 2, in any appropriate manner.

In accordance with my present invention, I loosely mount a sleeve 30 on the shaft 9. At its upper end the said sleeve 30 is provided with a head 31 in which are radial apertures 32 to receive a rod or rods such as 33 in Fig. 3, through the medium of which the sleeve 30 may be turned about the shaft 9. The lower end of the sleeve 30 is provided with a set of projecting lugs 34, designed to seat in complementary sockets 35 in a cam member 36, which constitutes an important feature of the present invention. In addition to the said sockets 35, the cam member 36 is provided in its under side with a plurality of, preferably four, grooves 37 which gradually recede from the center of the member 36, from their inner ends to their outer ends, the said outer ends being preferably open as illustrated. The said cam member 36 surrounds and is retained against lateral displacement by the shaft 9.

The table 2 comprises by preference four equidistant radial arms 3, Figure 2, in which are appropriately guided radially slidable jaws 4 on which are upstanding projections 5 and 5$^x$ to engage a split rim designated by 6, and the projections 5$^x$ on the jaws being recessed at 4$^x$ to accommodate and engage the lower flange on the rim. Connected preferably through the medium of threads 7 to the jaws 4 are links 8 on which are carried vertically disposed roller gudgeons 8$^x$. These gudgeons are disposed and movable in the cam grooves 37 of the cam member 36, and therefore it will be readily understood that when the cam member 36 is turned in one direction the jaws 4 will be powerfully moved outward, while when the cam member 36 is turned in the opposite direction the jaws 4 will be retracted or moved inwardly. From this it follows that through the medium of one or more handles socketed in the head 31 of the sleeve 30, the said sleeve 30 and the cam member 36 may be quickly and easily turned to move the jaws 4 for the expanding of a split rim or for the contraction of such a rim.

Manifestly when the rim 6 is expanded through the medium of the projections 5 until its ends are in opposed relation, the rim will be securely fixed in the tire 21, and when the rim is contracted through the medium of the projections $5^x$ until one end slips inside or outside of the other at the split point, the diameter of the rim will be reduced and in consequence a tire may be quickly and easily removed from the rim by hand or otherwise. When the rim is expanded within a tire in the manner described, a slight reverse turning movement of the sleeve 30 is all that is necessary to relieve the pressure of the projections 5 against the rim and to permit of the ready removal of the rim with its tire from the machine.

In order to hold the cam plate 36 in any position and against "slacking off" or casual movement, I tooth the periphery of the said plate 36, as indicated by $36^x$, and employ in combination with the same a double pawl $37^x$, Fig. 2.

In Fig. 9 I have illustrated the manner in which my novel mechanism can be used to advantage when a tire is to be removed from a solid or non-split rim designated by $6^x$. According to said arrangement the rim with tire thereon is placed outside the projections $5^x$ with the curved or off-set portion of the rim at the top, and the cam mechanism is utilized to hold the rim $6^x$ fast on the jaws 4. With this done the tire may be pressed downwardly and off the rim.

In order to hold the links 8 up to their work, I provide on the table 2 the guide lugs $8^x$, in pairs on each side of the links 8.

I have entered into a detailed description of the construction and relative arrangement of the parts embraced in the present and preferred embodiments of my invention in order to impart a full, clear and exact understanding of the said embodiment. I do not desire, however, to be understood as confining myself to the said specific construction and relative arrangement of parts, inasmuch as in the future practice of the invention various changes and modifications may be made such as fall within the scope of my invention as defined in my appended claims.

Having described my invention, what I claim and desire to secure by Letters Patent, is:—

1. A tire removing machine consisting of a pedestal, a table mounted thereon, an upright rising centrally from said table, a grooved cam member fitting on said upright having a series of openings around its center and having teeth on its periphery, a pawl to engage said teeth to hold the cam at desired adjustment, a vertical sleeve fitting upon said upright and having depending lugs to engage the series of openings at the center of the cam, a series of links having gudgeons at their inner end to engage the grooves of the cam, and tire clamps connected to the outer ends of said links.

2. A tire removing machine consisting of a pedestal, a table mounted thereon, an upright rising centrally from said table, a grooved cam member fitting on said upright having a series of openings around its center and having teeth on its periphery, a pawl to engage said teeth to hold the cam at desired adjustment, a vertical sleeve fitting upon said upright and having depending lugs to engage the series of openings at the center of the cam, a series of links having gudgeons projecting upward from their inner ends to engage the grooves of the cam to be moved thereby and having their outer ends threaded, and clamping jaws receiving said threaded ends and operated by the movements of said links.

In testimony whereof I hereunto affix my signature.

MAURICE PETER BREON.